Aug. 20, 1940.  C. W. DAVIDSON  2,212,012
CUTTER
Filed Oct. 10, 1938
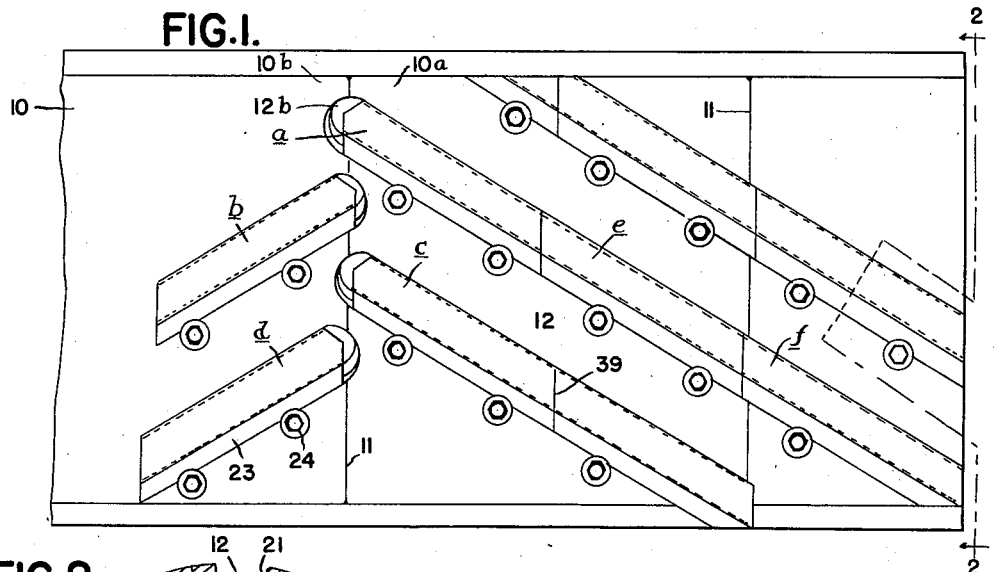
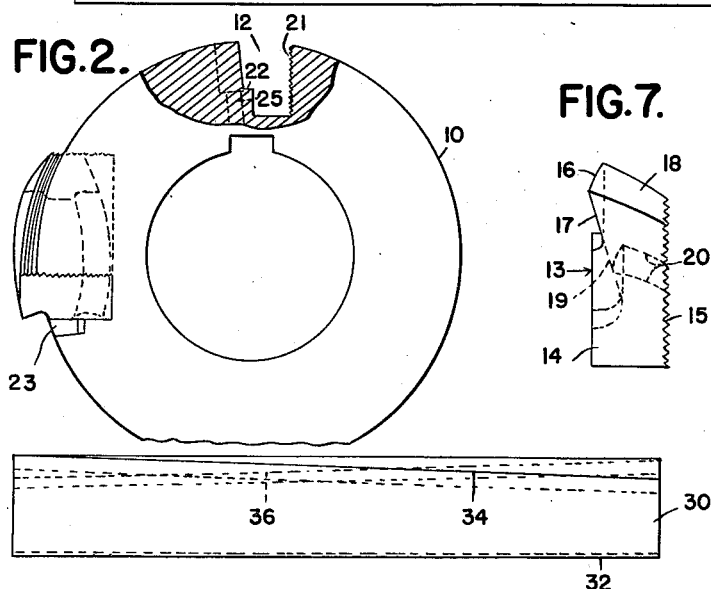
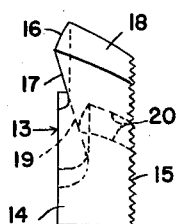
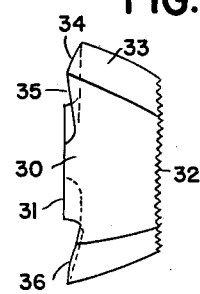
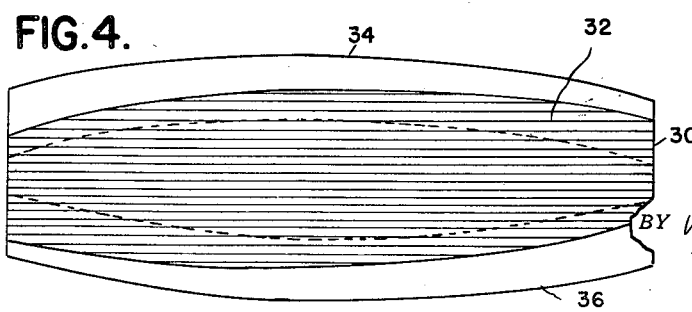
INVENTOR
CLARENCE W. DAVIDSON
BY Whittemore, Hulbert
and Belknap
ATTORNEYS Patented Aug. 20, 1940

2,212,012

UNITED STATES PATENT OFFICE 2,212,012

CUTTER

Clarence W. Davidson, Orchard Lake, Mich., assignor to Goddard & Goddard Company, Inc., Detroit, Mich., a corporation of Michigan Application October 10, 1938, Serial No. 234,296

16 Claims. (Cl. 29—105)

The present invention relates to cutters and more particularly to inserted blade cutters such as milling cutters, reamers, boring bars and special inserted blade tools of various types.

It is an object of the present invention to provide inserted blades in cutters of the type referred to which have cutting edges provided at opposite sides thereof.

It is a further object of the present invention to provide blades for insertion in slots in cutters, the teeth having cutting edges at opposite sides thereof.

It is a further object of the present invention to provide cutters having inserted blades, the inserted blades having a plurality of helically formed cutting edges thereon.

It is a further object of the present invention to provide cutters having inserted blades which are provided with helical cutting edges at opposite sides thereof, said helical cutting edges being of opposite hand.

It is a further object of the present invention to provide cutters having inserted blades which are provided with helical cutting edges at opposite sides thereof, said helical cutting edges being of same hand.

It is a further object of the present invention to provide inserted blade cutters having straight sided slots for the reception of inserted blades in combination with blades having helically formed cutting edges at the top and bottom thereof.

Other objects of the invention will be apparent as the description proceeds, and when taken in conjunction with the accompanying drawing, wherein Fig. 1 is a diagrammatic view similar to a side elevation illustrating the insertion of my improved blades in a cutter blank;

Fig. 2 is an end elevation taken along the line 2—2 of Fig. 1;

Fig. 3 is a top plan view of a cutter blade;

Fig. 4 is a side elevation of a cutter blade;

Fig. 5 is an end elevation of one form of a cutter blade;

Fig. 6 is an end elevation of another form of cutter blade; and

Fig. 7 is an end elevation of known cutter blades, indicating in dotted lines the same blade after resharpening and grinding.

In Fig. 1 I have more or less diagrammatically illustrated a cutter blank 10, which in the present instance is shown as cylindrical but which may be tapered or conical if desired. The cutter blank 10 may be solid or it may be sectional, the lines of division between sections, if such are provided, being indicated at 11. In either case, slots 12 are milled into the cutter blank or sections thereof, and where the sectional type cutter is employed, these slots are aligned as illustrated in Fig. 1.

Preferably and as taught in copending application, Serial No. 213,504, filed June 13, 1938, in the name of Clarence R. Besaw and assigned to the assignee herein, these slots are rectangular and are milled in the cutter blank by conventional means.

In Fig. 7 I have illustrated the type of inserted blade which has formerly been used in this type of cutter, and it will be noted that this blade 13 has a rectangular lower or body portion 14 which is provided along one surface with a plurality of parallel serrations 15. While the body of the inserted blade, as above stated, is rectangular, it is desirable to provide a helically formed cutting edge 16 and this is done in the initial forming of the blade. The metal immediately below the cutting edge 16 is undercut as indicated at 17 to provide proper rake, and the top of the blade as indicated at 18 is inclined rearwardly to provide proper cutting clearance.

The serrations in this type of blade are for the purpose of feeding the blade generally radially outwardly and clamping the same in adjusted position to permit resharpening of the tooth, as will hereinafter be more fully explained. This resharpening can continue until the major portion of the cutting blade has been used up in resharpening. However, as the top of the blade is ground away in resharpening it is necessary to continue the undercut 17 downwardly and this will result in removal of metal along the dotted line 19 until the blade is reduced to the form indicated in dotted lines 20.

As will be seen from Fig. 7 this involves the removal of an increasingly large amount of metal.

The type of blade illustrated in Fig. 7 has been proved to have many advantages in use and to present certain features of economy due to the fact that it may be continuously resharpened. Some of the advantages insofar as economy is concerned, however, are lost because a very substantial amount of metal must be removed, particularly as the blade approaches its ultimate limit.

It is to overcome the disadvantage of this type of blade and at the same time to retain all its important advantages that applicant has devised the tooth which embodies the present invention.

As previously stated, the type of blade illustrated herein as an embodiment of the present invention is adapted to be used precisely as a known blade illustrated in Fig. 7, and for this purpose slots are provided in a tool holder 10. These slots are angularly related to the axes of the tool holder 10 and are straight sided and straight bottomed and are formed by conventional milling. Such a slot is shown at 12 in Fig. 2, in which figure serrations 21 also appear. The slot, as illustrated, is provided with a shoulder 22 but if preferred the shoulder 22 may be omitted and the left wall of slot 12 (Figure 2) may be continuous to the bottom of the slot. A tapered wedge 23 is adapted to be positioned in the slot alongside the inserted blade and to be drawn inwardly by bolts 24 which are threaded into tapped holes 25. In practice the wedge 23 firmly clamps the blade in the slot with its serrations 15 engaging corresponding serrations 21 in the slot. As will be evident, by loosening bolts 24 and removing wedge 23, the blades may be set outwardly by an amount equal to one or more serrations. This outward movement of the blade requires resharpening of the blade to restore the cutter assembly to its desired dimensions, and as previously stated also involves grinding of the under cut to preserve adequate chip clearance. If preferred means may be provided which are effective to interlock the blade in the slot 12 in only one position of radial adjustment. For example, this may be accomplished by omitting one serration on either the blade or the side wall of the slot and by forming the cooperating surface of the other member to conform to or fit the blind serration. In this case, of course, radial adjustment of the blade is not permitted but when one cutting lip has been extended the blade may be inverted, bringing the other cutting lip into operative position. In this case, of course, the blind serration and cooperating surface will be formed centrally so that both cutting lips in new condition will be presented in desired radial position.

Blades embodying the present invention are illustrated in Figs. 3 to 6 and comprise a body portion 30 which is substantially a rectangular cross section having a flat plane surface 31 and a serrated plane surface 32. In the present type of reversible blade it is desirable that the side walls be parallel so that they may cooperate equally well with the wedge 23 in either position of use.

While the slots 12 are straight sided, it is desirable to present a helical cutting edge to the work for reasons which will be appreciated by those familiar with the art. Accordingly, the blade body 30 is provided with a top portion 33 which is formed to present a helically curved cutting edge 34. In Fig. 6 the top cutting edge 34 is indicated as formed along a right-hand helix. The blade back of the cutting edge 34 is relieved to provide cutting clearance and the forward face of the blade beneath the cutting edge 34 is recessed as indicated at 35 to provide a predetermined rake. The inclination of the surface 35 relative to the blade varies from end to end so that when assembled in the tool the blade will present a uniform rake angle along the blade as will be readily apparent.

The blade 30 is provided at its bottom with a second cutting edge 36 formed similarly to the cutting edge 34 and provided also with suitable clearance and rake angle as is apparent in the figure. As illustrated in this figure, the cutting edge 36 is formed on a left-hand helix. In all other respects it is identical with the cutting edge 34. As will be understood and as best seen in Fig. 4, the cutting edge is viewed from the side and appears as a curved line since it must follow the curvature of the cylindrical or conical tool block in which it is assembled.

The blade 40 illustrated in Fig. 5 is in all respects identical to the blade 30 illustrated in Fig. 6 with the exception that both cutting edges 44 and 46 are formed on right-hand helices. In a suitable case, as will be obvious, both cutting edges provided on a single blade may be formed on left-hand helices.

For convenience the blade as illustrated in Fig. 3 has end surfaces substantially perpendicular to the length of the blade. However, as will be apparent, it is desirable in most cases to provide beveled ends on blades 30, such as indicated at 39 in Fig. 1. This permits adjacent blades to be brought into closely abutting relation. It is not necessary, however, that the blades abut from end to end, and in Fig. 1 I have illustrated how different assembled blades may be caused to overlap to provide a cutting action which extends from end to end of the tool. Thus, for example, a blade $a$ extends completely across a section 10$a$ and into an adjacent section 10$b$ which is provided with a milled recess 12$b$ which is a continuation of the recess provided in the section 10$a$. In like manner an inserted blade $b$ is continued from the section 10$b$ into a recess suitably formed in the section 10$a$. Thus blades $a$ and $b$ overlap at their ends. Blades $c$ and $d$ have been illustrated as positioned so that their ends do not overlap.

It will be apparent in order for a blade to be reversible in the same slot, both cutting edges must be formed along helices of the same hand. At the same time, to permit inserted blades to be in end to end relation with the line of abutment in the plane of rotation, their ends must be beveled or inclined as indicated at 39 in Fig. 1. It will, therefore, be evident that if a blade, such as the blade $e$, were removed from the slot 12 and were inverted and replaced therein the inclination of the ends would extend differently and would no longer permit the blade $e$ to abut the blade $a$ and $f$. However, if a blade, such as the blade $e$ in Fig. 1, is formed with the cutting edge along a right-hand helix and is also formed with the lowermost or inactive cutting edge formed along a left-hand helix, the blades $e$ may be removed from the slot 12, inverted and substituted for a blade such as the blade $b$ or $d$ which require a left-hand helix. In such case, the inclination of the ends of the blades would be proper to permit all of the blades in the slots to be brought into abutting end to end relation.

Thus in the case where the cutter is provided with both right-hand and left-hand helical blades inversion of the blades to present the opposite surface is a simple matter. In the case where all of the blades of the cutter are of the same hand, it is possible to remove portions of the ends of said blades so as to permit interfitting engagement in either initial or inverted position. In such case it is also possible to provide the inserted blades with substantially square ends, as indicated in Fig. 3, if desired. It will be recognized that it is not essential in all cases that adjacent blades should be in closely abutting relation and in fact separation of the blades in many cases serves the useful function of assisting in breaking up the chips.

I have illustrated serrated blades, that is, blades which have serrations corresponding to serrations provided in the recess or slot in the tool body. However, it will be apparent that invention is applicable equally well to inserted blades of other types, such for example as inserted blades which are retained in position by interfitting portions which do not provide for adjustment. Blades of this type are well understood in the art and need not be illustrated herein.

According to the teachings of the present invention, inserted blades are provided for cutters which result in important economies in regrinding, since the life of the blade will actually be greater than that of teeth formed according to the former practice, and in addition teeth may be kept resharpened and provided with a formed surface having a proper rake angle and giving proper chip clearance throughout the life of the blade without the necessity for the excessive grinding which was described in connection with description of Fig. 7.

For purposes of illustration, I have found it convenient to disclose the present blade as formed to be associated with a straight sided slot, but it will be apparent that it need not be so formed. The invention is applicable to all inserted blade cutters of the type mentioned in the first paragraph and its important advantages in economy and utility follow it in all its applications.

Therefore, the foregoing detailed description has been given for clearness of understanding only, and no unnecessary limitations should be understood therefrom, but the appended claims should be construed as broadly as permissible in view of the prior art.

What I claim as my invention is:

1. An insertable cutter blade having helically formed cutting portions at opposite sides, said cutting portions having edges which are presented in the same general direction relative to the blade.

2. An insertable cutter blade of elongated shape having separate helically formed cutting edges along opposite sides.

3. An insertable cutter blade of elongated shape having separate helically formed cutting edges along opposite sides, said cutting edges being of the same hand.

4. An insertable cutter blade of elongated shape having separate helically formed cutting edges along opposite sides, said cutting edges being of opposite hand.

5. An insertable cutter blade having a generally straight sided body portion, and helically formed cutter portions along opposite sides of said body portion.

6. An insertable cutter blade having a generally straight sided body portion, and helically formed cutter portions along opposite sides of said body portion, said cutter portions being of opposite hand, and the ends of said blade being parallel and inclined to the length of said blade.

7. A cutter comprising a cutter body having both right and left hand slots for the reception of inserted blades, in combination with inserted blades having inclined end surfaces substantially in the plane of rotation, said blades having a top portion formed on a helix of the hand corresponding to the hand of its slot, and a bottom cutting portion formed on a helix of opposite hand.

8. In a tool having a tool body provided with a recess having retaining means for engaging an inserted blade, an inserted blade having means cooperating with said retaining means in either a first or an inverted position of said blade, and cutting portions at top and bottom of said blade adapted to be alternatively brought into cutting position or positioned within said recess as said blade is inverted.

9. In a tool having a tool body provided with a slot inclined to the axis of said body, said slot having retaining means for engaging an inserted blade, an inserted blade having means cooperating with said retaining means in either a first or an inverted position of said blade, and cutting portions at top and bottom of said blade adapted to be alternatively brought into cutting position or positioned within said recess as said blade is inverted, said cutting portions being formed on helices.

10. In a tool having a tool body provided with a straight sided slot inclined to the axis of body, said slot having retaining means for engaging an inserted blade, an inserted blade having means cooperating with said retaining means in either a first or an inverted position of said blade, and cutting portions at top and bottom of said blade adapted to be alternatively brought into cutting position or positioned within said recess as said blade is inverted, said cutting portions being formed on helices.

11. In a milling cutter of the type in which a rotary holder of circular section is provided with a generally rectangular slot, an insertable, invertible blade comprising a generally rectangular body receivable in said slot, and helically formed cutting portions extending along opposite sides of said body.

12. In a milling cutter of the type in which a rotary holder of circular section is provided with a generally rectangular slot, an insertable, invertible blade comprising a generally rectangular body receivable in said slot, and helically formed cutting portions extending along opposite sides of said body, said helically formed cutting portions being of opposite hand.

13. In a milling cutter of the type in which a rotary holder of circular section is provided with a generally rectangular slot, an insertable, invertible blade comprising a generally rectangular body receivable in said slot, and helically formed cutting portions extending along opposite sides of said body, said helically formed cutting portions being of the same hand.

14. In a milling cutter of the type in which a rotary holder of circular section is provided with a generally rectangular slot extending at an acute angle to the axis of rotation of the holder, an insertable, invertible blade comprising a generally rectangular body receivable in said slot, and helical cutting portions extending along opposite sides of said body.

15. In a milling cutter of the type in which a rotary holder of circular section is provided with a generally rectangular slot extending at an acute angle to the axis of rotation of the holder, an insertable, invertible blade comprising a generally rectangular body receivable in said slot, and cutting portions extending along opposite sides of said body, the ends of said blade being parallel and inclined to the length of the blade.

16. In a milling cutter of the type in which a rotary holder of circular section is provided with a generally rectangular slot extending at an acute angle to the axis of rotation of the holder, an insertable, invertible, radially adjustable blade comprising a generally rectangular body receivable in said slot, and helically formed cutting portions extending along the opposite sides of said body, said cutting portions being each provided with a front surface below the cutting edge inclined inwardly relative to the body of said blade, whereby repeated resharpening requires removal of increasingly large amounts of stock.

CLARENCE W. DAVIDSON.